United States Patent [19]

Markley

[11] Patent Number: 4,864,989
[45] Date of Patent: Sep. 12, 1989

[54] PRE-COMBUSTION CHAMBER SPARK PLUG AND METHOD OF IGNITING LEAN FUEL

[75] Inventor: George L. Markley, Montour Falls, N.Y.

[73] Assignee: Tice Technologies Corp., Beaver Dams, N.Y.

[21] Appl. No.: 214,035

[22] Filed: Jun. 30, 1988

[51] Int. Cl.$^4$ .............................................. F02M 19/00
[52] U.S. Cl. ..................................... 123/267; 123/297
[58] Field of Search ................ 123/267, 297, 305, 266

[56] References Cited

U.S. PATENT DOCUMENTS

| | | | |
|---|---|---|---|
| 1,373,498 | 4/1921 | Gaff | 123/267 |
| 1,476,547 | 12/1923 | Ross | 123/267 |
| 2,034,855 | 3/1936 | Alby | 123/267 |
| 2,331,912 | 10/1943 | Holthouse, Jr. | 123/267 |
| 2,795,214 | 6/1957 | Shook, II | 123/267 |
| 3,154,058 | 10/1964 | Warren | 123/267 |
| 3,213,839 | 10/1965 | Gitlin et al. | 123/267 |
| 3,502,055 | 3/1970 | Beesch | 123/267 |
| 3,661,125 | 5/1972 | Stumpfig | 123/267 |
| 3,855,972 | 12/1974 | Roberts | 123/297 |
| 3,908,625 | 9/1975 | Romy | 123/267 |
| 4,006,725 | 2/1977 | Baczek et al. | 123/267 |
| 4,074,664 | 2/1978 | Rollins | 123/267 |
| 4,319,552 | 3/1982 | Sauer et al. | 123/297 |
| 4,343,272 | 8/1982 | Buck | 123/297 |
| 4,448,160 | 5/1984 | Vosper | 123/297 |
| 4,546,740 | 10/1985 | Clements et al. | 123/304 |
| 4,548,172 | 10/1985 | Bailey | 123/298 |

OTHER PUBLICATIONS

The American Society of Mechanical Engineers, 84-DGP-1.

Primary Examiner—Raymond A. Nelli
Attorney, Agent, or Firm—Cislo & Thomas

[57] ABSTRACT

Within an internal combustion engine (including a rotary engine), an apparatus and method for the pre-combustion of a rich fuel mixture within a spark plug to ignite a leaner fuel mixture within the cylinder. Substantially undiluted gaseous pilot fuel is supplied by a unidirectional valve through an integral passageway within the spark plug to a pre-combustion chamber recessed within the ignition end of the spark plug. The pilot fuel is supplied to the pre-combustion chamber during the downstroke of the piston. During the upstroke of the piston, lean cylinder gases are compressed into the pre-combustion chamber, mixing with the pilot fuel to yield a combustible mixture. Controlled electric ignition of the mixture within the pre-combustion chamber sends a flame jet into the leaner fuel mixture producing timed combustion within the cylinder.

12 Claims, 2 Drawing Sheets

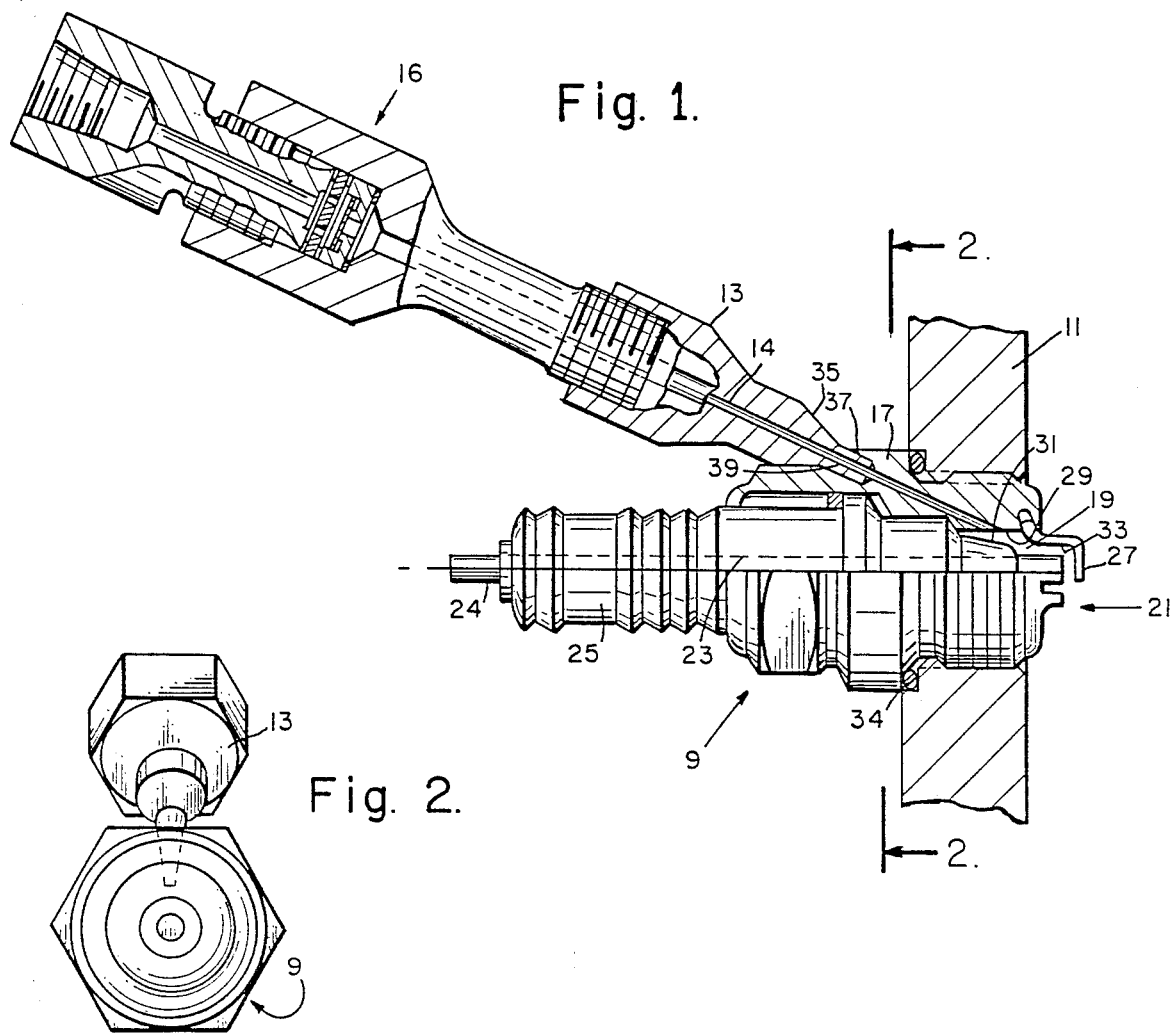
Fig. 1.
Fig. 2.
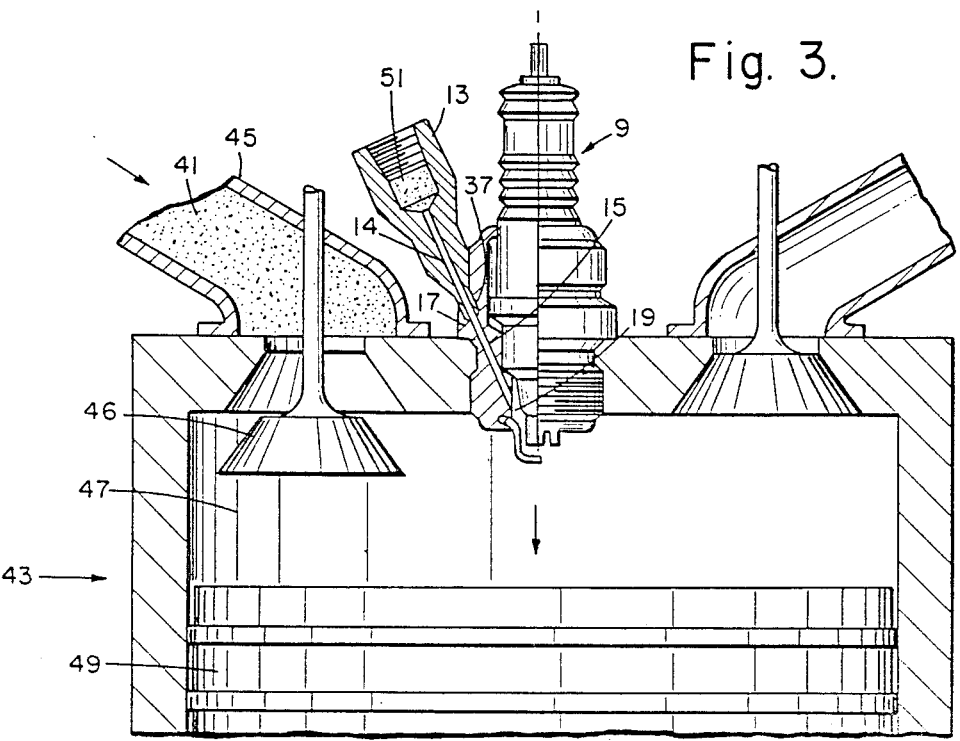
Fig. 3.

PRE-COMBUSTION CHAMBER SPARK PLUG AND METHOD OF IGNITING LEAN FUEL

BACKGROUND OF THE INVENTION

This invention relates generally to spark plugs, and, more particularly to spark plugs which increase the overall efficiency of combustion and reduce the amount of noxious emissions, particularly oxides of nitrogen (NOx) resulting from internal combustion engines.

Pre-combustion chambers (PCC's) are means for reducing exhaust emissions, particularly NOx, and for improving the performance and fuel economy of internal combustion engines. PCC's can be applied to gasfueled, spark ignited, reciprocating or rotary engines.

One of the most popular means of controlling NOx today is to increase the Air Fuel Ratio (AFR) of incoming gases to be combusted commonly referred to as lean burning. In lean burn engines, increasing AFR provides a greater mass of air to absorb the heat generated by a given mass of fuel, causing lower temperatures, and a slowing of NOx formation.

AFR's necessary to achieve desired low NOx levels require stratifying the cylinder charge by using a pre-combustion chamber to achieve consistent flame ignition. With PCC's and a very lean AFR, the extent of NOx control is much greater and is limited mainly by residual NOx attributable to richer pilot mixtures needed to ignite the leaner fuel.

The basic function of a PCC is to provide a nook or chamber where pilot or additive fuel can be combined with a portion of air to form a mixture consistently ignitable by a spark plug. The mixture when ignited provides the required energy to cause combustion of the very lean mixture within the main cylinder at the optimum time for efficiency and/or pollution control.

For consistent ignition the present day state of the art generally and erroneously holds that:
1. A PCC must contain a volume of between one and three percent of the minimum cylinder volume in order to provide sufficient ignition energy;
2. The passageway between the PCC and the main cylinder needs to be sized to cause the ignited charge of the PCC to torch into the main cylinder with significant penetration; and
3. The charge contained within the PCC must be of a near homogeneous mixture when ignited.

Spark plugs have been developed in the past to carry combustible gases into a cylinder. A mixture of gaseous fuel and air is supplied to the spark plug mixed in such a proportion, so as to be considered rich enough to ignite in the presence of a sufficient spark. The mixed pre-combustion gases are fed into a recessed area within the spark plug at its ignition end. Alternately, valving conduits can feed gaseous fuel into the recessed area, while other valving elements can supply air into the recessed area. Either the air or the gaseous fuel can be modulated to obtain a combustible fuel mixture. The combustible fuel can be ignited by a spark discharged from the spark plug. This sends a flame from the recessed area into the adjacent cylinder of the engine. Leaner fuel mixtures, normally not combustible by spark ignition, can be combusted as a result of the entering flame. The desirable results of such lean combustion are well discussed in U.S. Pat. No. 4,319,552 dated Mar. 16, 1982, as well as other documents referenced therein.

The complexities of the valving conduits and related connectors and the required gaseous fuel/air modulation make this approach expensive and often times leads to poor results. This is true as the modulation of fuel and air cannot be easily and properly adjusted.

There is a tremendous potential interest, especially in the control of air emissions from automobiles, for a spark plug which is easy to install, does not require valving conduits for both air and gaseous fuel, and where the air and gaseous fuel can be easily modulated to bring about pre-combustion within a spark plug to ignite substantially leaner mixtures as desired.

The features identified as being desired for pre-combustion spark plugs are all provided by the present invention.

SUMMARY OF THE INVENTION

The present invention is embodied in an improved pre-combustion chamber spark plug. The present invention can be easily installed on most any natural gas fueled internal combustion engine as well as gasoline fueled combustion engines. The spark plug is installed like any other spark plug. A fuel line feeds undiluted gaseous fuel to the pre-combustion spark plug of the present invention at a predetermined rate. Air is supplied from the cylinder of the engine during the compression stroke of the engine. A rich fuel mixture is formed within a recess within the spark plug which can be easily spark ignited causing a flame. The flame torches into the main cylinder and ignites a leaner fuel mixture within the cylinder resulting in combustion and power from the engine.

More particularly, the pre-combustion chamber spark plug of the present invention includes a plug body defining a fuel passageway therethrough. The plug body further defines a pre-combustion chamber axially located at one end and communicating with the fuel passageway. The passageway carries gaseous fuel to the pre-combustion chamber for ignition.

An axially located first electrode extending through the plug body also extends into the precombustion chamber. The electrode is insulated, except where extended into the pre-combustion chamber and at its opposite end.

A second electrode spaced a distance away from the first electrode extends into or defines the precombustion chamber. The second electrode is thoroughly insulated from the first electrode except where the second electrode extends into the pre-combustion chamber.

The fuel passageway allows gaseous fuel to flow into the pre-combustion chamber due to a decrease in relative pressure within the pre-combustion chamber due to a decrease in relative pressure within the adjacent cylinder of the internal combustion engine. This decrease is a result of the cylinder's intake stroke.

The pre-combustion chamber fills with gaseous fuel. Next, air residing within the cylinder is pushed into the pre-combustion chamber forming the combustible mixture. The air flows into the pre-combustion chamber because of the cylinder's compression stroke increasing the relative pressure within the cylinder. The mixture is then ignited by an electrical current creating an electrical potential between the first and second electrodes, thereby causing a spark.

The gaseous fuel to the pre-combustion chamber can be regulated by a unidirectional fluid flow check valve assembly which only allows the fuel to flow through the passageway of the plug body to the pre-combustion chamber. Combusted gases cannot flow through the check valve assembly.

Other aspects and advantages of the present invention will became apparent from the following description of the preferred embodiment, taken in conjunction with the accompanying drawings, which illustrate, by way of example, the principles of the invention.

BRIEF DESCRIPTION OF THE DRAWINGS

FIG. 1 is a side elevational view of a precombustion chamber spark plug embodying the present invention, with a portion of the spark plug and the unidirectional valve shown in cross section;

FIG. 2 is a bottom plan view of a portion of the pre-combustion chamber spark plug embodying the present invention and a nozzle of the present invention shown in perspective, taken in the direction of the arrows 2—2 in FIG. 1 with a passageway shown in phantom;

FIG. 3 is a side elevational cross-sectional view of the pre-combustion chamber spark plug of the present invention shown assembled within the relevant portion of a head of a cylinder of an internal combustion engine during its intake stroke;

DESCRIPTION OF THE PREFERRED EMBODIMENT

Figure 4:
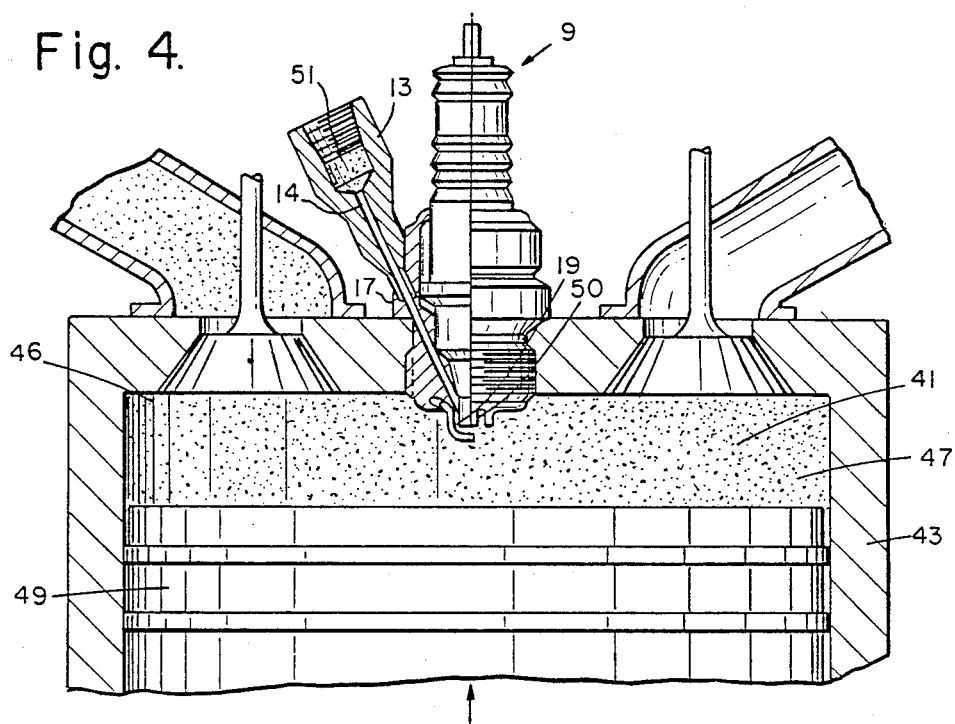
FIG. 4 is a side, elevational cross-sectional view of the pre-combustion chamber spark plug of the present invention shown assembled within the relevant portion of a cylinder of an internal combustion engine during its compression stroke.

As shown in the drawings, the invention is embodied in a pre-combustion chamber spark plug 9 of a type that can be utilized adjacent to a cylinder 11 of an internal combustion engine (not shown). As shown in FIGS. 1 and 2, a nozzle 13 having a passageway 14 allows gaseous fuel, preferably natural gas, to flow from a unidirectional valve 16 to a passageway 15 formed in plug body 17 of the spark plug 9. The passageway 15 as shown in FIG. 1 and in phantom in FIG. 2, allows communication between the nozzle 13 and a pre-combustion chamber 19 which is located at a first end 21 of the spark plug 9 which is held by the cylinder 11 when the plug 9 is installed.

A center electrode 23 has a cylindrical shape and is located axially through the plug body 17. The electrode 23 is surrounded by a ceramic material 25 that insulates the electrode 23 except at its exposed end 31 and its contact end 24. A second electrode 27 may be a cylindrical sleeve concentric with the center electrode 23 and located at the first end 21 of the spark plug 9. Many different shapes and types of electrodes may be used. The pre-combustion chamber 19, in essence, is formed by the space between an inner surface 29 of the plug body 17 and the outer surface 31 of the ceramic material 25. In this embodiment, the pre-combustion chamber 19 is enlarged by the region defined between the exposed end 31 of the center electrode and a inner surface 33 of the second electrode 27.

While many different types of pre-combustion chamber shapes and geometries may be used, the one shown in the drawing is but one geometry. Many of the structural features of the spark plug 9 are similar to other spark plugs commonly known in the art. Thus, a seal 34 maintains a tight fit between the spark plug 9 and the cylinder and is located therebetween concentrically around the first end 21 of the spark plug 9.

The nozzle 13 has a progressively narrowing end 35 which can be received within a nozzle port 37 having internal threading 39. Alternatively, the spark plug 9 may have a stem (not shown) with external threading to engage a complementary threaded nozzle (not shown).

However, in the illustrated embodiment, the nozzle port 37 is located within the plug body 17 and allows communication between the exterior of the plug 9 and the passageway 15 within the plug body 17. The nozzle's narrow end 35 can be threaded into and engage the threading 39 within the interior of the nozzle port 37.

Figure 5:
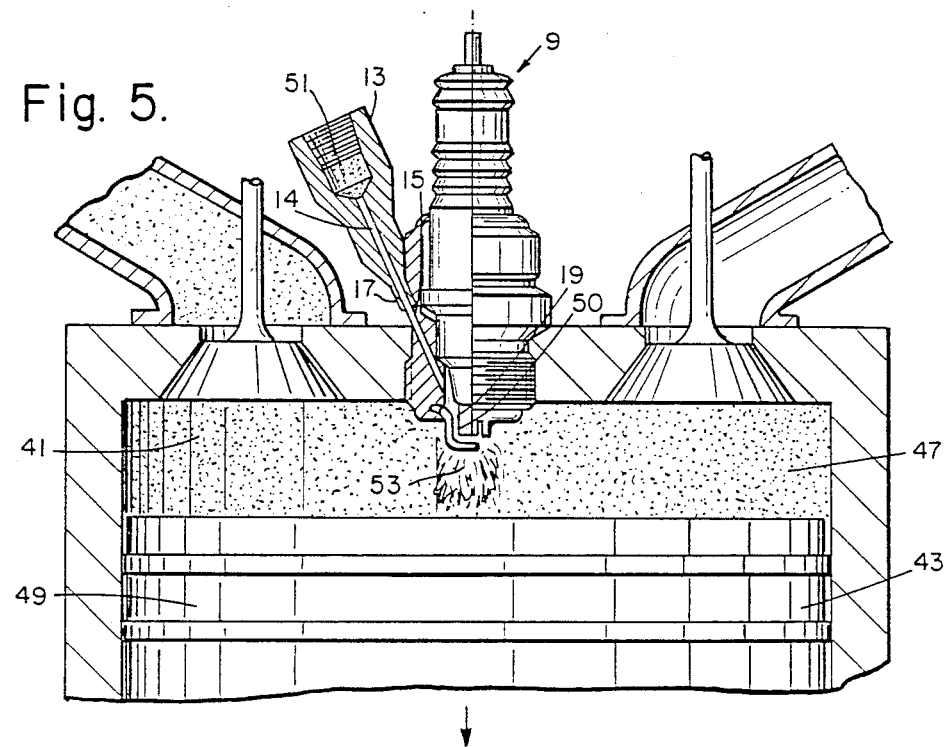
FIG. 5 is a side, elevational cross-sectional view of the pre-combustion chamber spark plug of the present invention shown assembled within the relevant portion of a cylinder of an internal combustion engine during its combustion stroke.

Referring to FIGS. 3, 4 and 5, the operation of the present invention will be discussed. The invention of the present application allows a pre-determined fuel charge to be ignited when it is optimally compressed to its highest temperature and pressure. This results in a highly reliable ignition and greatly improved control of the combustion cycle.

During the intake stroke of the internal combustion engine, as shown in FIG. 3, a lean fuel air mixture 41 of combustible gases is drawn into cylinder 43. The lean air fuel mixture 41 is supplied, from a source not shown, by means of intake manifold 45 by reason of intake valve 46 being in an open position.

The lean mixture 41 cannot reliably be ignited by spark ignition, because of the low stochiometric percentage of fuel to air. Incorporated by reference are U.S. Pats. Nos. 4,413,593, 4,104,989, and 4,135,481 which discuss at great depth stochiometric values for combustion, as well as the desirability of combusting lean fuel air mixtures.

The lean fuel air mixture 41 is drawn into the interior 47 of the cylinder 43 by piston 49 of the engine. Downward motion of the piston 49 creates a pressure differential between the fuel air mixture 41 supplied at the manifold 45 and the interior 47 of the cylinder, thereby drawing in the mixture 41.

Simultaneously, a gaseous fuel 51, preferably natural gas or another type of gasified fuel, similarly is drawn through the unidirectional valve 16 through the nozzle 13 to the plug body 7 at the nozzle port 37. The gaseous fuel 51 is drawn through the passageway 15 into the pre-combustion chamber 19. The gaseous fuel 51 can be supplied to the unidirectional valve 16 from the engines fuel supply source (not shown) directly without carburetion. The gaseous fuel 51 flows into the pre-combustion chamber 19 because of the pressure differential caused by the downward motion of the piston 49 and/or because the gaseous fuel 51 may be under pressure. The flow of the gaseous fuel 51 can be regulated by the pressure of the gaseous fuel supplied. Also, the diameter and length of passageways 14 and 15 and the parameters of the unidirectional valve 16 can be designed to accommodate a variety of flow situations.

As shown in FIG. 4, the gaseous fuel 51 in the pre-combustion chamber 19 cannot be ignited because it is too rich to combust, while the fuel air mixture 41 within the interior 47 of the cylinder 43 is too lean to reliably spark ignite. The unidirectional fluid flow check valve 16 can be used to regulate the gaseous fuel 51 into the nozzle 15 and maintain flow in only the direction toward the spark plug 9. Such a valve is disclosed in U.S. Pat. No. 4,531,543, the disclosure of which is hereby incorporated by reference.

During the compression stroke of the engine, the intake valve 46 closes. The piston 49 moves upwardly compressing the lean fuel air mixture 41 within the interior 47 of the cylinder 43. Some of the lean fuel air mixture 41 is pushed into the pre-combustion chamber 19 of the spark plug 9. The rich gaseous fuel 51 within the pre-combustion chamber 19 mixes with the lean fuel air mixture 41 creating a new combustible mixture 50 which can be readily ignited by spark ignition.

The increased pressure created by the piston 49 may be greater than the pressure of the rich gaseous fuel 51 flowing through the nozzle 13. As such the unidirectional valve 16 may prevent further flow of rich gaseous fuel 51 into the pre-combustion chamber 19.

As shown in FIG. 5, the resulting combustible mixture 50 within the pre-combustion chamber 19, being a combination of the rich gaseous fuel 51 and the lean fuel air mixture 41, can be readily ignited by a spark created between the center electrode 23 and the second electrode 27. The spark is created when a sufficient potential is developed between electrodes, 23 and 27.

The spark ignites the combustible mixture 50 creating a flame jet 53 which shoots out of the pre-combustion chamber 19 and into the interior 47 of the cylinder 43. The flame jet 53 ignites the lean fuel air mixture 41 within the cylinder, with correct timing to most efficiently drive the piston 49 downward. The result being that a very lean, normally noncombustible, fuel air mixture 41 is reliably combusted, yielding greater thermodynamic efficiencies and lower overall NOx production. The overall concept and purpose of NOx control is more thoroughly discussed in the previously referenced patents.

The materials and features of the cylinder 43 described and shown in FIGS. 3, 4 and 5 are well known in the art, as is the operation of two or four-stroke internal combustion engines. As such, further description of their operation, structure, and materials will not be discussed.

As to the spark plug 9, it is conventionally made, except as modified in accordance with the invention, and comprises materials found in spark plugs commonly known in the art. However, the plug body 17 and nozzle 13 must be made of a sufficiently high temperature and corrosive resistant material. Such a material may be precipitation hardened stainless steel (17-4 pH Carpenter Custom 450 or Carpenter 455).

The pre-combustion chamber spark plug of the present invention is a very effective and efficient way to install a pre-combustion chamber ignition system in standard engines. It is easy to install in that sophisticated carburetion or fuel air mixing and control devices are unnecessary. Complicated and separate fuel and air supply lines are not required. Only a simple fuel supply line is needed. Furthermore, direct liquid cooling of the pre-combustion chamber is not necessary.

Initial tests of one embodiment of the present invention show substantially similar NOx exhaust reductions as more complicated, more expensive, and more difficult to install pre-combustion chambers.

Although the present invention has been described in detail with reference only to the disclosed preferred embodiment, it will be appreciated by those of ordinary skill in the art that various modifications may be made without departing from the invention. Accordingly, the invention is limited only by the following claims:

I claim:

1. A pre-combustion chamber spark plug for igniting a gaseous fuel mixed with air to form a resulting combustible mixture within the spark plug, whereby a leaner fuel mixture within an adjacent cylinder of an internal combustion engine can be ignited comprising:
    (a) a spark plug body defining a recess axially located at an open end and a closed end defining a fuel passageway therethrough to carry gaseous fuel to said recess for ignition;
    (b) an axially located first electrode extending through said plug body and adjacent to said recess and extending into the adjacent cylinder of the engine;
    (c) a second electrode located a distance away from said first electrode and extending into the adjacent cylinder of the engine, adjacent to said recess, wherein said passageway allows gaseous fuel to flow into said recess due to a decrease in relative pressure within the adjacent cylinder of the internal combustion engine, wherein air residing within the cylinder can flow into said recess forming the combustible mixture which can be ignited by an electrical potential between said first and second electrodes causing a spark, wherein the combustible mixture is ignited at said open end of said recess to subsequently ignite the leaner fuel mixture in the rest of the cylinder.

2. A pre-combustion chamber spark plug as defined in claim 1, wherein said open end of said recess allows said first and second electrodes to extend therethrough into the adjacent cylinder of the engine allowing a uniform flame front through the adjacent cylinder upon ignition.

3. A pre-combustion chamber spark plug as claimed in claim 2, comprising a unidirectional valve connected to a gaseous fuel line to provide substantially undiluted gaseous fuel through said fuel passageway to said recess.

4. A pre-combustion chamber spark plug as claimed in claim 3, wherein said unidirectional valve allowing air to enter through said recess directly from the cylinder of the internal combustion engine at a point where the spark plug is installed within the cylinder.

5. A pre-combustion chamber spark plug as claimed in claim 4, wherein said unidirectional valve allows gaseous fuel flow through said fuel passageway to said recess when relative pressure within the cylinder is reduced during the early portion of the cylinder's compression stroke, and wherein said open end of said recess extends into the cylinder of the engine.

6. A pre-combustion chamber spark plug as claimed in claim 5, wherein natural gas is primarily used as the gaseous fuel.

7. A pre-combustion chamber spark plug as claimed in claim 5, wherein air supplied to the recess can only enter from the cylinder of the engine during the cylinder's compression stroke.

8. A method of using a pre-combustion chamber spark plug to ignite a rich gaseous fuel mixed with a lean gaseous mixture to form a combustible mixture and thereby ignite a leaner gaseous mixture within an adjacent cylinder of an internal combustion engine comprising the steps of:
    (a) drawing the rich gaseous fuel through a fuel passageway defined within the spark plug to a recess defined by an open end of the spark plug having electrodes, the end being installed within and extending into the adjacent cylinder of the internal combustion engine;

(b) pushing the lean gaseous mixture from within the cylinder of the internal combustion engine toward the open end of the spark plug to mix with the rich gaseous fuel to form the combustible mixture; and (c) igniting the combustible mixture toward the open end of the spark plug using said electrodes which extend into the cylinder sending a flame jet through the cylinder and igniting the leaner gaseous mixture as a uniform flame front.

9. A method of using a pre-combustion chamber spark plug as claimed in claim 6, wherein the gaseous fuel is substantially undiluted with other gases.

10. A method of using a pre-combustion chamber spark plug as claimed in claim 7, wherein, said step of drawing gaseous fuel is accomplished using a drop of pressure at said open end of the spark plug caused by the downstroke of a piston within the cylinder of the internal combustion engine.

11. A method of using a pre-combustion chamber spark plug as claimed in claim 10, wherein the step of pushing the lean gaseous mixture toward the open end of the spark plug is achieved by the upstroke of said piston within the cylinder of the internal combustion engine, thereby mixing the rich gaseous fuel with the lean gaseous mixture to form the combustible mixture.

12. A pre-combustion chamber spark plug for igniting a lean gaseous fuel mixture within an adjacent communicating cylinder of an internal combustion engine defining a combustion chamber and comprising:

(a) a spark plug body having a first elongated end and an opposed enlarged end defining an axially located opening, said spark plug body having a fuel passageway communicating therethrough, said passageway adapted to be connected to a gaseous fuel source to carry gaseous fuel to said opening for ignition;

(b) a first electrode extending axially through said plug body and said opening being located adjacent to the cylinder and extending into the cylinder of the engine; and (c) a second electrode located radially from and spaced away from said first electrode and being adjacent to said opening, wherein said passageway allows gaseous fuel to flow toward said opening due to a decrease in relative pressure within said adjacent cylinder of the internal combustion engine, wherein air residing within the cylinder can flow toward said opening, thereby forming a combustible mixture which can be ignited by an electrical current creating a voltage potential between said first and second electrodes causing a spark, wherein the combustible mixture near said opening is ignited to subsequently creating a uniform flame front through the cylinder of the engine and ignite the lean gaseous fuel mixture in the cylinder.

* * * * *